Figure 4:
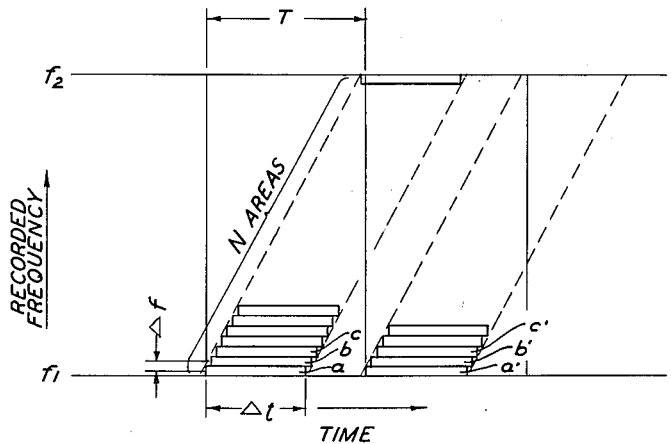

Feb. 13, 1962 L. A. MEACHAM 3,021,478
WAVE ANALYSIS AND REPRESENTATION
Filed Nov. 21, 1951 2 Sheets-Sheet 1
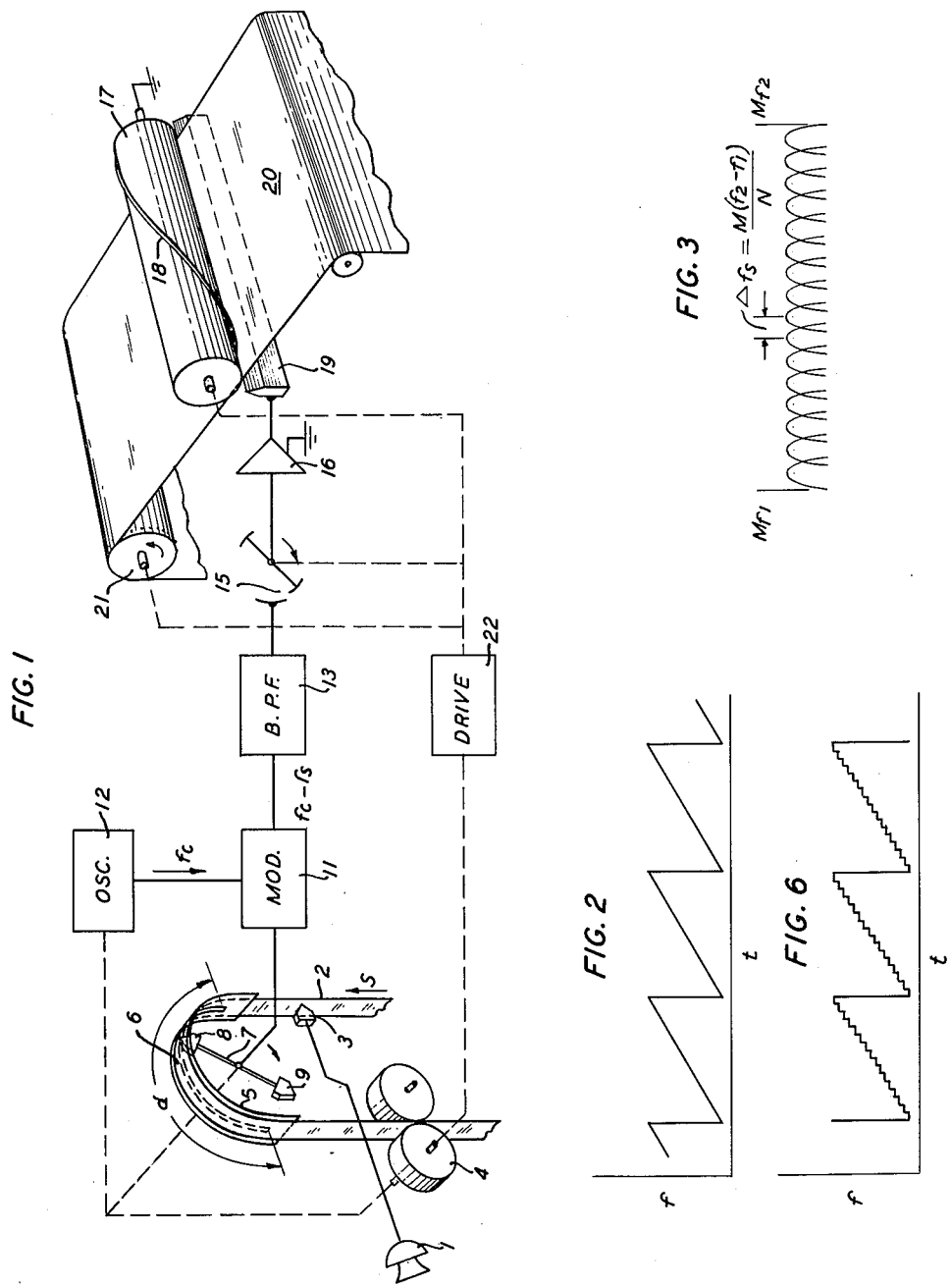
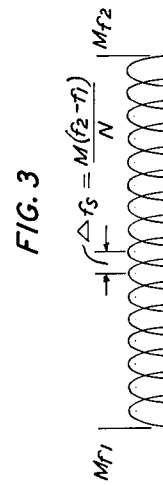
FIG. 3
FIG. 2
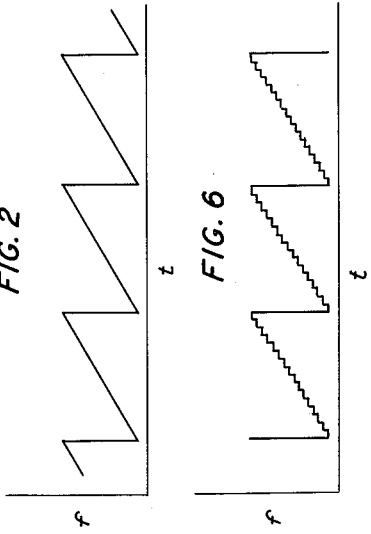
FIG. 6
INVENTOR
L. A. MEACHAM
BY Harry C. Hart
ATTORNEY

United States Patent Office 3,021,478
Patented Feb. 13, 1962

3,021,478
WAVE ANALYSIS AND REPRESENTATION
Larned A. Meacham, New Providence, N.J., assignor to Bell Telephone Laboratories, Incorporated, New York, N.Y., a corporation of New York
Filed Nov. 21, 1951, Ser. No. 257,628
5 Claims. (Cl. 324—77)

This invention relates to the analysis of signals into their several harmonic components and to the continuous display of the resulting spectrum for visual examination.

Spectrum analyzers, or "spectrographs" as they have come to be termed fall into one or the other of two categories. Those of the first category are distinguished by a large number of fixed filters, each of which is tuned to pass a narrow band of adjacent frequency components within the broader band of which the signal is composed. Such an instrument may be rapid in its action; indeed, it may perform its analysis continuously and substantially contemporaneously with the generation of the signal being analyzed, provided too high a degree of resolution is not asked of it. But the large number of fixed filters required makes it bulky and costly. Furthermore, unless the bands overlap sufficiently its operation when some component of the signal falls within a filter pass band differs from its operation when this component falls between adjacent bands. An analyzer of the second category employs a heterodyne device, i.e., the combination of a single fixed filter, a sweeping oscillator and a modulator, such that the modulation side frequencies pass through the filter in succession. Such an analyzer tends to be slower in operation than is one of the first category: for a resolution of the signal into N different frequency components the analysis, which with a spectrograph of the first category requires N fixed filters, requires only one filter in the second category, but also requires that this filter be used to examine the entire signal at each of N frequencies in succession. This demands recording and repeated scanning of the signal, and adequate time must be allowed for these processes.

This limitation has not always been recognized, and analyzers have been proposed as carrying out a contemporaneous analysis of a voice signal by the use of heterodyne filters in which the functions of recording and repeated scanning were not included. Inevitably much of the available information as to the time variation of the spectral composition of the signal has thereby been lost, since each single short segment of the signal wave was examined at only one frequency.

Where continuity and contemporaneity of the analysis are not required, it has been common first to make a record of the wave form of the signal on a suitable medium, for example a magnetizable rim of a drum, and thereafter, at leisure, to perform the scanning and analysis of the recorded signal. This permits a full and complete analysis, but not on a continuous basis. In practice it has led to the familiar spectrograms having a length of about one foot, which corresponds to the duration (about 2.5 seconds) of an audible signal conveniently recorded on a drum. Analysis of a much longer signal in this manner involves the inconvenience of dividing the signal into suitable sections, switching the apparatus back and forth between recording and analyzing functions, and splicing the resulting spectrograms together to form a continuous strip.

It is the object of the present invention to reach a compromise between such apparently incompatible considerations, and to furnish a high resolution analysis of a signal on a continuous basis, and in some cases on a substantially instantaneous or contemporaneous basis, and with a minimum amount of complexity of apparatus. Among the features of the invention are:

(a) The formation of a preliminary wave form record of the signal;
(b) The examination of such record, by a process of scanning a short segment thereof repeatedly and at high speed;
(c) The selection of component frequencies by a heterodyne device;
(d) The display of the resulting spectrum by laying it down, element for element, in frequency-time coordinates, the frequency coordinate being laid down the more rapidly;
(e) An analyzing filter whose pass band extends through a range of frequencies which is as great as that of the original signal to be analyzed. This makes for high speed of analysis; a corresponding sacrifice of resolution is prevented by the employment of carefully chosen magnitudes for the length of the signal sample analyzed, the scanning repetition rate, and the like, as well as by the employment of sampling techniques.

The invention will be fully apprehended from the following detailed description of preferred embodiments thereof, taken in connection with the appended drawings, in which:

FIG. 1 is a block schematic diagram showing apparatus embodying the invention and illustrating its operation; and FIGS. 2 to 6, inclusive, are explanatory diagrams of assistance in the exposition of various features of the invention.

Referring now to the drawings, FIG. 1 shows the component elements of a system according to the invention in schematic form and indicates the sequence of its operations. A signal to be analyzed originating, for example, in a microphone 1 is recorded on a suitable medium such as a magnetic tape 2 by means of a recording head 3 of known construction, past which the tape is advanced, e.g., by rollers 4 at a speed $s$. Placed immediately beyond the recording head is an arcuate track 5 over which the tape 2 travels. This track determines the length $d$ of the tape segment 6 to be scanned. It is here shown as extending through 180 degrees or a semicircle and the reproducing scanner 7 accordingly comprises two magnetic scanning heads 8, 9 mounted to rotate about an axis and located oppositely to each other. Thus, as one scanning head leaves the semicircular tape segment 6 the other head enters it. Accordingly, one head is in operation at all times. Other arrangements are equally suitable. For example, the tape segment might extend through an arc of 120 degrees or one-third of a circle in which case three equally spaced heads would be employed.

In accordance with known techniques, the track 5 over which the tape segment 6 passes may contain a central slot which extends for its full length and nearly its full width. The scanning heads 8, 9 may thus be brought into close proximity with the surface of the tape on which the signals are recorded.

The outputs of the heads 8, 9 are connected in series or parallel and fed to a modulator 11 of known construction to which is also fed a beating signal of frequency $f_c$ derived from an oscillator 12. The oscillator is of the sweep frequency variety such that its output frequency $f_c$ changes steadily from a lower limit to an upper limit and returns abruptly to its lower limit to repeat the cycle. This may be provided for in well-known fashion by such means as a rotary tuning condenser. The sawtooth wave of oscillator frequency variation is shown in FIG. 2.

The output of the modulator 11, which includes the modulation products of the instantaneous oscillator frequency with various component frequencies in the output of the pick-up heads 8, 9, is next applied to a band-pass filter 13, preferably one having a Gaussian characteristic, whose midband frequency $f_0$ is adjusted to the frequency of a desired modulation product, for example the first order lower side frequency of the instantaneous oscillator frequency at some point in its sweep and a desired one of the components derived from the pick-up heads. The band width of this filter 13 will be discussed in detail below.

The filter output is connected to a sampler 15 which as a practical matter may be an electronic device of known construction but which is here symbolically represented for the sake of simplicity as a rotary mechanical contact. The output of the sampler 15 is applied, by way of an amplifier 16 to a plotter which again may be of any desired variety, but which for the sake of specific illustration is shown as of the so-called "lawn mower" variety in which a cylinder 17 having a single helical ridge 18 spiralling around it from end to end is juxtaposed with a stationary straight narrow electrode 19 parallel to the axis of the cylinder 17, a strip of approximately sensitized paper 20 passing between them. This paper may be treated, for example, with a titanium-oxide-carbon compound in a fashion to render it sensitive to an electric discharge between the straight electrode 19 and the ridge 18 of the cylinder 17. A suitable paper is the so-called "Teledeltos" facsimile paper of Western Union Telegraph Company. This paper strip is continuously advanced by a roller 21 under control of the mechanical drive unit 22, in a direction normal to the axis of the cylinder 17.

The rotation of the scanner 7 is synchronized with that of the sampler 15 in such a fashion that the output of the filter 13 is sampled once and only once during each passage of a scanning head 8 or 9 over the tape segment 6. Similarly the rotation of the plotter cylinder 17 is synchronized with the frequency sweep of the oscillator 12 in such fashion that the cylinder 17 makes one revolution for each full cycle of the oscillator frequency variation. The phases of these operations are adjusted so that, at the start of the oscillator frequency sweep the point of closest proximity between the helical ridge 18 and the straight electrode 19 lies at one margin of the paper strip 20 while at the end of the frequency sweep this point of closest proximity lies at the other margin of the strip. Also the sampler 15 is phased with respect to the scanner 7 in a fashion to gate the filter 13 to the plotter electrode 19 at each instant at which a scanning head 8 or 9 is about to leave the record segment 6. Lastly, the rate of the scanner 7 and the sampler 15 on the one hand is preferably related to that of the oscillator frequency sweep and the plotter, on the other hand, in such fashion that the tape segment 6 is scanned a fairly large number N of times in the course of each frequency sweep. These synchronization requirements may conveniently be met by the provision of a common mechanical drive unit 22 of any desired variety.

To summarize the operation of the apparatus described above, the signal to be analyzed is first recorded on the tape 2. A segment 6 of this record of length $d$ is scanned at a high speed $v$ by the pick-up head or heads 8, 9, and this scanning is repeated a number N of times during which the record tape moves at the lower speed $s$, through the full length $d$ of the recorded segment 6. These operations occupy a time T. For each such scan the output frequency of the oscillator 12 has some value $f_c$ such that the modulation product of this frequency with some particular component (or narrow band of components) of the signal reproduced from the tape segment lies within the pass band of the filter 13. The filter output is, therefore, proportional to the energy of this component. It is sampled just prior to the termination of each traversal of the tape segment 6 by a scanning head 8 or 9, to apply to the plotter electrode 19 a pulse of energy which is similarly proportional to the same component. An electric discharge whose intensity is, therefore, approximately proportional to the energy of this component takes place between the straight electrode 19 and the helical ridge 18 of the plotter and forms an impression on the paper 20 whose density is an indication of the magnitude of the energy of the component in question. This mark is located on the paper at a distance along its length as determined by the steady advance of the paper strip 20 and at a distance across its width as determined by the phase of the rotation of the cylinder 17 This phase being correlated with the oscillator frequency sweep as described above, the lateral distance across the tape at which this mark appears may be taken as an indication of the frequency of the component in question.

Coming now to the adjustment and proportioning of the dimensions and other parameters of the system in accordance with the invention, let it be assumed that the components of the original signals which are of interest extend throughout a frequency range $f_1$ to $f_2$. The total band width is thus $f_2-f_1$. If this band were to be analyzed with a bank of filters proportioned to discriminate between adjacent frequencies differing by $\Delta f$, a number N of such filters would be required. The spacing between the midband frequencies of adjacent filters would thus be given by the expression $$\Delta f = \frac{f_2 - f_1}{N} \qquad (1)$$

When, however, the signals have been recorded on the magnetic tape 2, moving with a speed $s$, the tape bears a space-variant counterpart of these signals, and as the tape advances along the track, the pick-up scanner 8 or 9 sweeps over the segment 6 of length $d$ at a much greater speed $v$. This operation produces a new time-variant signal in which each component has been raised in the frequency scale, as compared with the same component in the original signal, by a frequency multiplication factor $$M = \frac{V \pm s}{s} \doteq \frac{V}{s} \qquad (2)$$

Thus the band of frequencies of interest in the derived time-variant signal extends from the frequency $Mf_1$ to the frequency $Mf_2$; i.e., its band width is $M(f_2-f_1)$. If this band were to be analyzed by a bank of N filters, the midband frequencies of these filters would have a spacing of $$\Delta f_s = M\Delta f = \frac{M(f_2 - f_2)}{N} \qquad (3)$$

Such a breakdown of the band $Mf_2-Mf_1$ is depicted in FIG. 3.

When, as in the present instance, the analysis is carried out with a single filter, a heterodyne oscillator and a modulator, the filter is employed to examine various frequencies at various times according to a program which will be understood by reference to the diagram of FIG. 4. This diagram shows a frequency-time domain representing the actual spectral composition of the original signal, which the system of the invention is to analyze and portray in the form of impressions on the recording paper 20. In this domain, recorded frequency is plotted vertically against time, horizontally. The domain may be blocked off into small elemental areas, each having dimensions $\Delta f \times \Delta t$ as indicated, and each representing the part of the domain dealt with by a single particular scan of a reproducing head 8 or 9 over the segment 6 of record tape of length $d$. The height $\Delta f$ of each elemental area corresponds to the shift, between successive scans, in the frequency of the original signal component for which the corresponding derived component matches the midband frequency of the analyzing filter 13. The width $\Delta t$ of the elemental area corresponds to the duration of the original signal that is recorded upon magnetic tape of length $d$. In the final spectrographic display, one dot is recorded for each of these elemental areas.

Figure 5:
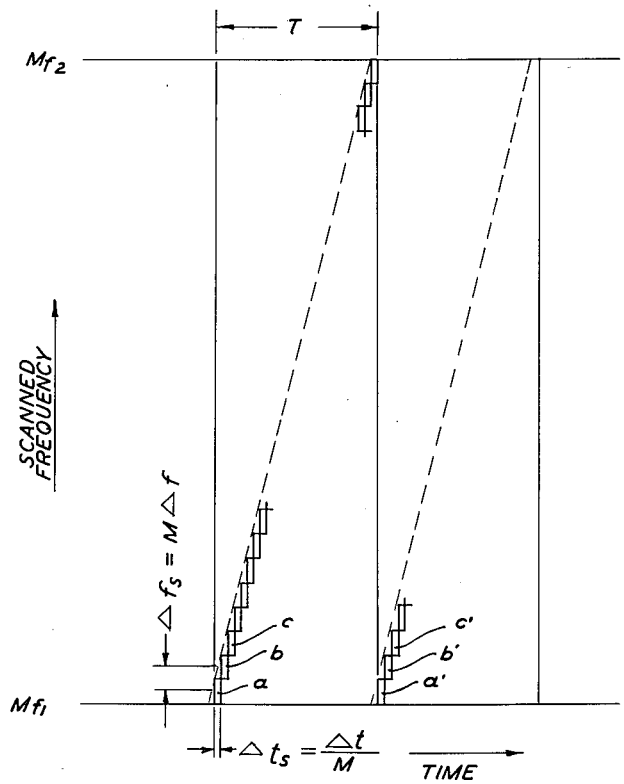

The elemental areas $a$, $b$, $c$, etc., corresponding to successive scans, lie one above another in sloping columns of N such areas, adjacent areas largely overlapping each other in the time dimension. The examination of such overlapping elemental areas would obviously not be possible using a single analyzing filter, were it not for the processes of recording and repeated scanning, since the same filter could not possibly deal with two different frequency bands simultaneously. The use of recording and scanning is illustrated in FIG. 5, which is a frequency-time domain similar to that of FIG. 4, but given in terms of the scanned or derived signal and hence covering the band from $Mf_1$ to $Mf_2$. Here the elemental areas have the same designations as corresponding areas of FIG. 4. The dimensions of each area, however, are now $$\Delta f_s \times \Delta t_s$$

where, according to Equation 3, $$\Delta f_s = M \Delta f$$

and since the distance $d$ is scanned at a speed $v$ which is M times the recording speed $s$, $$\Delta t_s = \frac{\Delta t}{M}$$

Comparison of FIG. 5 with FIG. 4 shows that each elemental area of the array has been stretched in the frequency dimension by the factor M and shrunken in the time dimension by the same factor M to such a point that the overlap between adjacent areas of FIG. 4 has been eliminated in FIG. 5. These new areas can now be scanned sequentially in time with a single filter, N of them being dealt with during the period T.

It may be noted that with the elemental scanning areas of either FIG. 4 or FIG. 5 shown as rectangles, it is thereby implied that the analyzed frequency was constant during each individual scan. This could actually be the case if the frequency of the sweeping oscillator 12 were varied stepwise as indicated in FIG. 6. When, however, the frequency changes smoothly and continuously throughout the scanning process, the elemental areas of FIG. 4 (or FIG. 5) should, strictly, be shown as parallelograms, with their bases sloping upward a distance $\Delta f$ during time $\Delta t$ (or $\Delta f_s$ during time $\Delta t_s$). If the values of $\Delta f$ and $\Delta t$ are properly related, as will be described, the effect of the slope is trivial.

The dimension $\Delta f_s$ has been defined as the effective frequency spacing between successive scans, in terms of the scale of derived frequencies. The band width of the analyzing filter should preferably have a value approximately equal to $\Delta f_s$, for if it were narrower, particular frequency components might "fall in the cracks" between scans and thus be ignored, and if it were wider the ability of the system to resolve closely spaced components would be correspondingly reduced.

Corresponding remarks may be made with regard to the time dimension $\Delta t_s$. This dimension has been defined as the time required for a scanning head to traverse the distance $d$ along the tape 2; i.e., the recorded segment 6. The transient response time of the filter 13 should be approximately equal to $\Delta t_s$, for if it were longer, the filter 13 would not have time to respond accurately to the derived signal reproduced in any particular scan, and if it were shorter the efficiency of the system and its ability to resolve the signal components would be impaired. The use of the sampler 15, as will be discussed more fully hereinafter, allows the transient filter response to the sudden onset of each successive scan to be disregarded, so that only what is effectively a steady state response is recorded on the spectrogram. For this reason, the sampler 15 is very important, and its use is presumed in the foregoing remarks regarding the relationship between $\Delta t_s$ and the response time of the filter 13.

It is common knowledge that the response time of a filter is reciprocally related to its band width. Specifically, a Gaussian filter completes its transient response and reaches its steady state response to a suddenly applied sine wave of any frequency in a time equal to the reciprocal of its band width, measured between frequencies for which its attenuation is ¼ neper (2.17 decibels) greater than its midband loss. From this it follows that for optimum design the following relationship should be at least approximately satisfied:

$$\Delta t_s = \frac{1}{\Delta f_s} \qquad (4)$$

Substituting values that have been shown equal to $\Delta t_s$ and $\Delta f_s$ gives $$\frac{\Delta t}{M} = \frac{1}{M \Delta f}$$

or $$\Delta t = \frac{1}{\Delta f} \qquad (5)$$

Referring once more to FIG. 5, the elemental areas $a$, $b$, $c$, etc., are staggered in time, advancing by the interval T for one sweep across the analyzed frequency band. This stagger or advance is brought about by the gradual movement of the magnetic tape 2 past the scanner 7 during the oscillator sweep. With the beginning of the next sweep, a new row of areas $a'$, $b'$, $c'$, etc., is dealt with. From the foregoing it is evident that for efficient analysis T should be approximately equal to $\Delta t$. If T is greater than this (as in the case shown by way of example in FIG. 4) regions of available signal information are left unanalyzed between successive columns of scanned areas. If, on the other hand, T is smaller than $\Delta t$, the scanned areas will overlap ($a'$ lying partially on top of $a$, for example). In this case no information will be ignored, but efficiency in the analysis will be reduced by unnecessary rescanning. Thus a preferred relationship is $$T = \Delta t \qquad (6)$$

Since $\Delta t$ represents the duration of the original signal recorded on the tape segment 6 of length $d$, and since T corresponds to the advance of the tape during N scans, Expression 6 may be rewritten:

$$T = N\left(d/v\right) = \Delta t = \frac{d}{s} \qquad (7)$$

But from Equation 2

$$v = MS \qquad (8)$$

Wherefore, from (7)

$$M = N \qquad (9)$$

Referring back to Equation 3 and substituting the Relation 9 therein gives the result $$\Delta f_s = f_2 - f_1 \qquad (10)$$

In other words the spacing between the centers of successive component bands of the derived signal which are applied to the actual analyzing filter has a value equal to the entire band width of the original signal. As has been shown, the filter band width should preferably have this same value. This result by itself is in sharp contrast to the practice of the prior art in which the band width of the analyzing filter was normally made very narrow.

The operation of the sampler 15 will now be explained in greater detail. The need for the sampler stems from the fact that the output of the scanner 7 comprises repeated reproductions of short segments of the recorded signal. The end of one reproduction does not, in general, flow continuously into the beginning of the next one. Accordingly, at the onset of each scan there is likely to be an abrupt discontinuity in the wave applied to the analyzing filter 13, regardless of whether the components of the original signal were highly variable with time or were extremely constant. The filter 13 must thus respond to a series of sudden changes in its input which are brought about by the scanning process and do not characterize the original signal. For example, if the derived signal contains a strong component which does not fall within the filter band, the filter is likely to have a transient response to each onset of the component which is considerably greater in amplitude than the response it would have to a steady application of the same component. The result of this is that if a sampler were not used, a strong component would cause some marking of the spectrograph recording paper 20 at points corresponding to frequencies other than the true frequency of the component in question. This would tend to blur the recording. The sampler corrects this effect completely by opening the circuit between the filter output of the filter 13 and the recording electrode 19 while the transient exists, and closing it only momentarily at instants when the filter has reached substantially steady state response to the termination of the preceding scan and the beginning of the current one; i.e., closing it at the moment just prior to the completion of each scan.

In the foregoing description, it has been taken for granted that the analysis was performed contemporaneously with the recording. In some cases, when the band to be analyzed is fairly broad, the tape speed $s$ must be relatively fast to allow an adequate wavelength on the tape for a component of highest frequency, and since $v=Ns$, the scanning speed $v$ may become impracticably high. In such cases, contemporaneous analysis with a single filter may not be feasible, but continuous analysis of tape previously recorded at a speed which may be greater than $s$ is still perfectly possible. That is to say, the system of the invention has the flexible feature that the recording and continuous scanning functions may be performed independently at different times, allowing great freedom of choice of recording speeds and frequency bands of recorded signals, when contemporaneity is not essential. The equations derived herein may be applied to this case of recording at a tape speed other than $s$ if they are properly interpreted in accord with the principles presented.

What is claimed is:

1. Apparatus for analyzing a complex wave having components of interest in the range $f_1$ to $f_2$, which comprises means for continuously making a space-variant record of said wave at a speed $s$, means for defining a short segment, of length $d$, of said record, the portion of said wave occupying said segment being of duration T, means, operating simultaneously with said record-making means, for continuously advancing said record past said segment-defining means at said speed $s$, wherefore $$s=\frac{d}{T}$$

means for scanning said segment at a high speed $v$ that is N-fold higher than said speed $s$, wherefore $$v=Ns=N\frac{d}{T}$$

and for repeating said scanning N times during the interval T, whereby the duration of each scan is equal to $T/N$, to produce a time-variant wave comprising a sequence of accelerated reproductions of that portion of the original complex wave which is contained in said record segment, each of said reproductions containing components, in the frequency range $Nf_1$ to $Nf_2$, which are respectively N-fold greater in frequency than the corresponding components of said portion of the original wave, a band pass filter of bandwidth $$\Delta f_s=f_2-f_1=\frac{v}{d}$$

and midband frequency $f_0$, a source of an oscillation of frequency variable through the range $f_0+Nf_1$ to $f_0+Nf_2$ means for varying the frequency of said oscillation through a range equal to the filter bandwidth $\Delta f_s$ between each scan and the next, a modulator connected to said filter and supplied with said variable frequency oscillation and with the time-variant wave produced by said scanning means, for systematically translating, during consecutive ones of said accelerated reproductions, successive different contiguous subgroups of components of the original wave, each of extent $$\frac{f_2-f_1}{N}$$

to the pass band of said filter, said filter being further so proportioned that its transient response time $$\Delta t_s=\frac{1}{\Delta f_s}$$

is equal to the duration $$\frac{T}{N}$$

of any one of said scans, whereby the energy in each of the N contiguous subgroups of components of the original wave is determined, for each consecutive selected record segment, in the course of one and only one of the N successive scans, without either overlaps or underlaps, and means for visually displaying the filter output in time-frequency coordinates.

2. In combination with apparatus as defined in claim 1, means for maintaining substantial constancy of the record length which separates the record segment last scanned from the record portion last recorded.

3. In combination with apparatus as defined in claim 1, sampling means synchronized with said scanning means and connected to said filter for deriving a regular sequence of brief samples of the output of said filter, one such sample being derived in the course of each passage of said scanning means over said record segment.

4. Apparatus as defined in claim 3 wherein each sample is derived just prior to the completion of each passage of the scanning means over the record segment.

5. Apparatus as defined in claim 1 wherein the visual display means comprises an impression-sensitive element, a writing element, means for repeatedly advancing said writing element across said impression-sensitive element in one coordinate in proportion to frequency at one speed, means for continuously and regularly advancing said sensitive element past said writing element in proportion to time at a lesser speed, and means for applying the output of said filter to said writing element, thereby to make an impression on said sensitive element which is substantially proportional to said filter output.

References Cited in the file of this patent

UNITED STATES PATENTS

| | | |
|---|---|---|
| 2,403,982 | Koenig | July 16, 1946 |
| 2,403,986 | Lacy | July 16, 1946 |
| 2,403,997 | Potter | July 16, 1946 |
| 2,424,218 | Begun | July 22, 1947 |
| 2,425,003 | Potter | Aug. 5, 1947 |
| 2,429,236 | Potter | Oct. 21, 1947 |
| 2,476,445 | Lacy | July 19, 1949 |
| 2,484,618 | Fisher | Oct. 11, 1949 |
| 2,492,062 | Potter | Dec. 20, 1949 |
| 2,530,693 | Green | Nov. 21, 1950 |
| 2,615,078 | Foster et al. | Oct. 21, 1952 |

OTHER REFERENCES

"The Cathode Ray Sound Spectroscope," article in The Journal of The Acoustical Society of America, vol. 21, No. 5, September 1949, pp. 527–537.